(12) United States Patent
Whitehead (10) Patent No.: US 6,295,285 B1
(45) Date of Patent: Sep. 25, 2001

(54) GLOBAL PACKET DYNAMIC RESOURCE ALLOCATION FOR WIRELESS NETWORKS

(75) Inventor: James F. Whitehead, Mercer Island, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/842,755

(22) Filed: Apr. 17, 1997

(51) Int. Cl.[7] ..................................................... H04Q 7/00
(52) U.S. Cl. .......................... 370/329; 370/330; 370/245
(58) Field of Search .................................. 370/329, 330, 370/331, 332, 333, 216, 218, 241, 242, 245, 349

(56) References Cited

U.S. PATENT DOCUMENTS

| | | | | |
|---|---|---|---|---|
| 5,210,753 | * | 5/1993 | Natarajan | 370/337 |
| 5,239,673 | * | 8/1993 | Natarajan | 455/33.1 |
| 5,274,841 | * | 12/1993 | Natarajan et al. | 370/337 |
| 5,276,703 | * | 1/1994 | Budin et al. | 370/347 |
| 5,732,077 | | 3/1998 | Whitehead | 370/349 |
| 5,790,536 | * | 8/1998 | Mahany et al. | 370/338 |
| 5,917,806 | * | 6/1999 | Lin et al. | 370/237 |

OTHER PUBLICATIONS

Performance and Capability of Distributed Dynamic Channel Assignment and Power Control in Shadow Fading—by J.F. Whitehead Page numbers 910–914. Presented at the ICC'93 Geneva, IEEE International Conference on Communications '93, on May 23–26, 1993 in Geneva, Switzerland.

* cited by examiner

*Primary Examiner*—Hassan Kizou
*Assistant Examiner*—Daniel Previl (57) ABSTRACT

A reuse management method for a packet-switched wireless network having a plurality of links between a plurality of terminal devices and at least one base station. Each link is a wireless connection in a medium between a terminal device of the plurality of terminal devices and the one base station. A request for a link in the medium for transmitting a data packet is received. Permission to transmit the data packet over the requested link is granted based on compatibility of the requested link with other links in the medium. Granting permission to transmit the data packet includes assigning a slot for transmitting the data packet over the requested link. The packet-switched wireless network is also coupled to a plurality of connections. Each connection has an associated quality of service and the packet-switched wireless network has a virtual service rate. A data packet is received from a connection of the plurality of connections, and is placed in a quality-of-service (QoS) queue based on the quality of service associated with the connection and based on the virtual service rate of the packet-switched wireless network.

32 Claims, 8 Drawing Sheets

GLOBAL PACKET DYNAMIC RESOURCE ALLOCATION FOR WIRELESS NETWORKS

BACKGROUND OF THE INVENTION

1. Field of the Invention

The present invention relates to the field of telecommunications. More particularly, the present invention relates to a method and system for controlling medium access and quality of service in a packet-switched wireless telecommunication network.

2. Description of the Related Art

Wireless local area networks (LANs) and wide area networks (WAN) connect portable equipment, such as, telephones, data terminals, portable computers, to one another and to wired networks, often using radio frequency (RF) links. The RF spectrum allocated to such a wireless network is limited, thus limiting the capacity of the network, that is, the number of simultaneous users of the network. One approach for increasing network capacity is frequency reuse, by which two or more users transmit on the same frequency at the same time. Frequency reuse entails interference at the intended recipient of one transmitter caused by another transmitter. The interference is destructive if it causes the intended communication to fail.

Many conventional wireless systems manage frequency reuse. For example, most cellular telephone systems employ fixed assignment of frequency channels to cells, that is, the areas served by the respective base stations of the system. Base stations are the points of connection to a wired network. The fixed channel assignments (FCA) are determined so that spatial separation and the consequent reduction in interference levels prevent destructive interference. More recently, dynamic channel assignments (DCA) or, synonymously, dynamic resource allocation (DRA) methods have been devised for adapting channel assignments to the changing location, number and interference levels of individual users. Some conventional DRA systems rely on a priori information describing the interference between cells so that simultaneous users in mutually interfering cells are not assigned the same channel. Other conventional DRA systems adapt directly to interference. Such systems measure one or more parameters, such as interference levels, bit error rates (BER), and frame rates (FER), and assign channels to users in such as manner preventing or stopping destructive interference. DRA systems are generally thought have higher capacity and greater flexibility than FCA systems because of their adaptive capabilities. Conventional interference-adaptive DRA systems are generally thought to have yet a higher capacity and greater flexibility than systems using a priori cell-to-cell interference information because they adapt to changing conditions within a cell, and can apply optimal transmission power-control methods. For examples of such systems, see J. Zander, "Near-optimum transmitter power control in cellular radio systems," IEEE Trans. Vehic. Tech., vol. VT41, no. 1, pp. 57–62, 1992; G. J. Foschini, "A simple distributed autonomous power control algorithm and its convergence," IEEE Tran. Vehic. Tech., Vol. 42, No. 4, pp. 641–646, November. 93; and R. Beck and H. Panzer, "Strategies for Handover and Dynamic Channel Allocation in Micro-Cellular Mobile Radio Systems," 39th IEEE Vehic. Technol. Conf., pp. 178–185, 1989.

Conventional DRA systems have been developed primarily for circuit-switched networks, in which a connection, that is, a call, of perhaps several minutes duration is established and transmission continues on the selected channel until the call terminates or user movement requires a handoff to another base station. These conventional networks primarily serve voice traffic where occasional loss of information is tolerable. In most conventional interference-adaptive DRA systems, the possibility is explicitly allowed that a connection degrades caused by fading or by actions by another user. In some practical DRA systems, a channel assignment is made only on the basis of a measured quality for the link in question without any specific action to protect other links. Such systems are designed to detect degraded connections by error rate detection and perform a handoff for finding a satisfactory channel, often within the same base station. These rearrangements are tolerable if they are not too frequent, since the occasional loss of information is tolerable. Such systems may also try and reject one or more channels on the basis of detected errors before finding a satisfactory channel for a connection.

In general, packet-switched networks cannot tolerate information loss, and cannot rely on connections of long duration for efficiency. When destructive interference (collisions) occur in packet switched networks, the destroyed packets must often be re-transmitted. To date, only very limited application of DRA to packet-switched networks has been made and only on a cell-to-cell basis.

Media access control (MAC) protocols have been developed for controlling packet-switched access to both wired and wireless media. Users in Carrier-Sense Multiple Access (CSMA) networks avoid transmitting when another user is sensed to be transmitting. Related techniques, such as, Busy-Tone Multiple Access, and Idle-Signal Multiple Access, for example, have been introduced for reducing the problem of hidden terminals that CSMA is known to suffer in radio media. For example, see Jean-Paul Linnzartz, "Narrowband Land-Mobile Radio Networks", Artech House, Norwood, Massachusetts, 1983. One such method worth noting involves an exchange of a short Request to Send (RTS) message sent by the transmitter, and a Clear to Send (CTS) message sent by the intended receiver only when the receiver detects no competing transmissions. For example, see K. J. Biba et al., "Virtual carrier detection for wireless local area network with distributed control," International Patent Application No. WO 95/01020. For other examples of MAC protocols, see R. H. Hochsprung et al., "Local area network with carrier sense collision avoidance," U.S. Pat. No. 4,661,902; and V. Barghavan et al., "MACAW: A media access protocol for wireless LANs," Computer Communication Review, vol. 24, no. 4, pp. 212–225, Octber. 1994.

Methods for controlling the transmit power level within the system have been devised for multihop packet radio networks with the goal of optimizing the net effect on number of hops required to reach the destination and the number of interfered links. The number of hops decrease with greater transmit power, although the number of interfered links increase with greater transmit power.

Conventional DRA methods have been applied to basestation controlled wireless LANs on a cell-to-cell basis using a priori interference information. This approach relies on a centrally-controlled scheduling algorithm and wired communications among base stations. Each base station sends and polls for packets in its own cell, but only during intervals determined by a central controller. The central controller schedules the intervals of operation for the individual cells by solving graph coloring problems based on a previously-supplied interference graph among the cells. For examples of this approach, see K. S. Natarajan, "Scheduling methods for efficient frequency reuse in a multi-cell wireless network controlled by a wired local area network," U.S. Pat. No;

5,239,673, S. Natarajan, "Robust scheduling mechanism for efficient bandwidth usage in multicell wireless local networks," U.S. Pat. No. 5,210,753; S. Natarajan et al., "Methods for polling mobile users in a multiple cell wireless network," U.S. Pat. No. 5,274,841; and H. Tan, "Dynamic resource allocation for radio-local area networks", Ph.D. thesis, Imperial College, University of London, March 1992.

Distributed DRA methods have been applied to peer-to-peer and base-station controlled wireless LANs, on a per-link basis, in which an exchange of short control packets, between sender and receiver precedes each data packet transmission. The exchange serves to inform other stations so that they can avoid interfering with the packet in question. For example, J. F. Whitehead, "Packet dynamic resource allocation (DRA) for wireless networks," Proc. IEEE Vehic. Tech. Conf., Atlanta, April, 1996.

Scheduling methods have been developed for controlling the delay performance individually for each of many connections or queues in wired packet-switched networks, particularly high-speed multimedia networks. Such a scheduling method controls the order of service of packets from a resource within the network, such as a transmission link between two switches for example. Many such methods are intended for providing each connection with a certain quality of service (QoS), that is, a guaranteed share of the resource's capacity, with low average delay or low delay variation. Different connections may need different qualities-of-service. For example, a voice connection may require 64 Kbit/s with very low delay variation. As an example, see C. Partridge, Gigabit Networking, Addison-Wesley, Reading Mass., 1994, pp. 265–287; K. Sriram, "Methodologies for Bandwidth Allocation, Transmission Scheduling, and Congestion Avoidance in Broadband ATM Networks," IEEE Global Telecommunications Conference, December 1992, Orlando; and J. M. Peha et al., "Implementation Strategies for Scheduling Algorithms in Integrated-Services Packet Switched Networks," IEEE Global Telecommunications Conference, December 1991, Phoenix, pp. 1733–1740.

For wireless multimedia networks, medium access control (MAC) protocols have been developed for supporting such scheduling methods for single base-station operation, but without reuse. These conventional protocols provide for explicit base-station scheduling of all packet transmissions on an uplink radio channel that is shared among the terminals and controlled by the base station. Some such protocols are of demand-assignment type, meaning that terminals may make short requests (demands) to send packets, using either a random-access or base-scheduled method, and then the base schedules (assigns) the actual packet transmissions. For example, see M. J. Karol et al., "Distributed-Queuing Request Update Multiple Access (DQ-RUMA) for Wireless Packet (ATM) Networks", IEEE Intern. Conf. on Comm., Seattle, June 1995; and P. F. Smulders et al., "Application of the asynchronous transfer mode on indoor radio networks," proceeding of PIMRC/WCN '94, September 1994, The Hague, pp. 839–843.

In spite of the above-described advancements, what is needed is a reuse management method for a packet-switched wireless network that operates on a per-packet, a per-connection or a per-link basis, that offers the full benefit of minimum coloring, maximum independent set, and other combinatorial optimization algorithms, and having per-packet power control features. Further, a precise quality-of-service management approach for a wireless networks having multiple base stations in conjunction with a reuse management approach is needed. Further still, determination of station-to-station interference relationships and path gains as a product of system operation, avoiding the need to supply such information a priori, as an aspect of a reuse management approach is needed.

SUMMARY OF THE INVENTION

Advantageously, the present invention provides reuse management on per-packet or per-connection or per-link basis, offering the full benefit of minimum coloring, maximum independent set, and other combinatorial optimization algorithms with per-packet power control features, provides precise quality-of-service management in wireless networks having multiple base stations in conjunction with reuse, and determination of station-to-station interference relationships and path gains as a product of system operation, avoiding the need to supply such information a priori.

The present invention provides these advantages by providing a method of reuse management for a packet-switched wireless network having a plurality of links between a plurality of terminal devices and more than one base station. Each link is a wireless connection in a medium between a terminal device of the plurality of terminal devices and the one base station. The method includes the steps of receiving a request for a link in the medium for transmitting a data packet, and granting permission to transmit the data packet over the requested link based on compatibility of the requested link with other links in the medium. The step of granting permission to transmit the data packet includes the step of assigning a slot for transmitting the data packet over the requested link. According to the invention, the packet-switched wireless network is coupled to a plurality of connections. Each connection has an associated quality of service and the packet-switched wireless network has a virtual service rate. A data packet is received from a connection of the plurality of connections, and is placed in a global wireless network queue based on the quality of service associated with the connection and based on the virtual service rate of the packet-switched wireless network.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
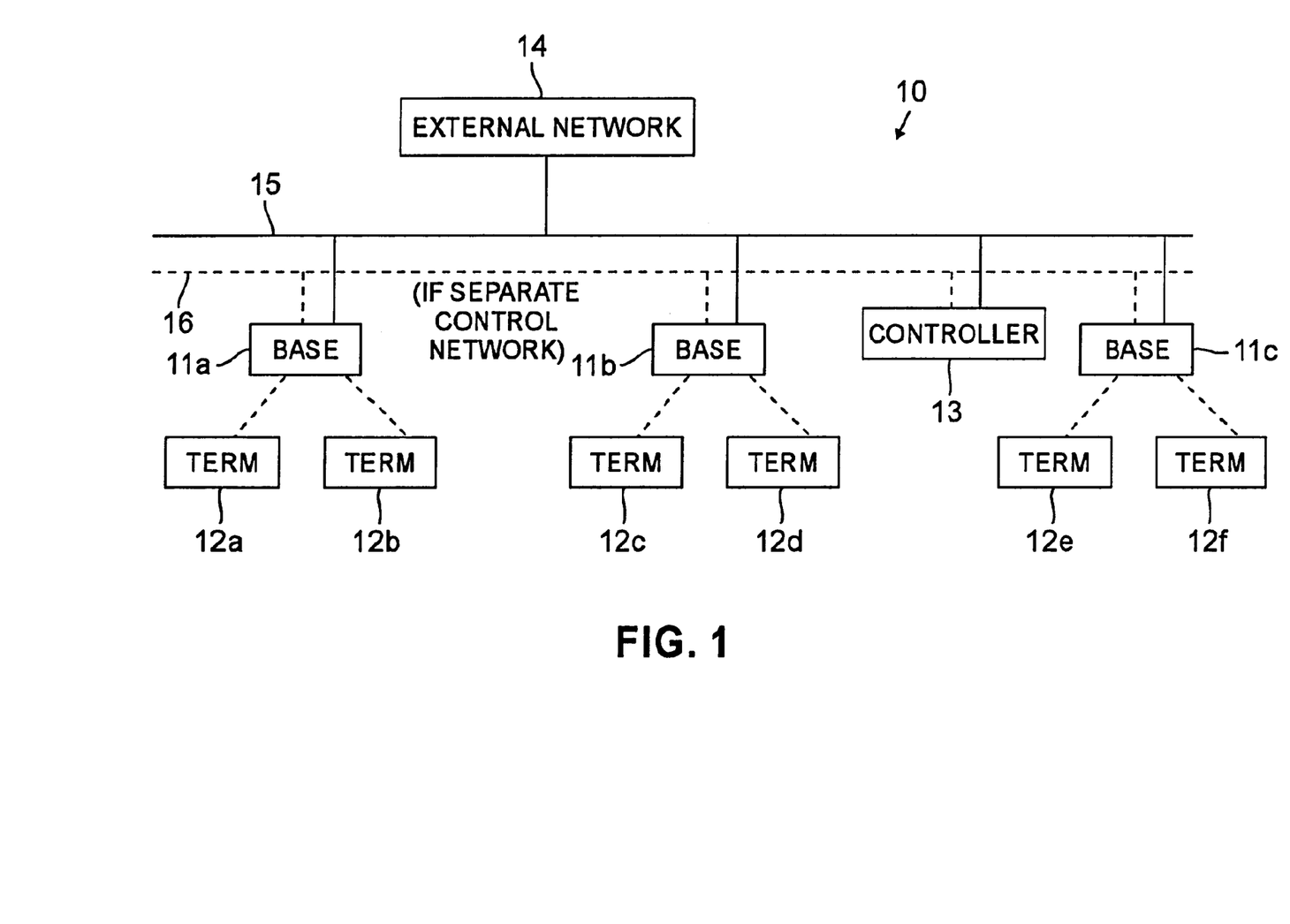
FIG. 1 shows a general configuration of global packet dynamic resource allocation system according to the present invention.

FIG. 1 shows a general configuration of global packet dynamic resource allocation system 10 according to the present invention. System 10 includes a plurality of base stations 11a–11c, a plurality of terminals 12a–12f and a controller 13. Terminals 12 communicate through base stations 11 to external networks and to other wireless terminals, of which only external network 14 is shown. The network of system 10 may be either connectionless or connection-oriented and aspects of the present invention that pertain only to connection-oriented networks will be noted. Base stations 11 exchange communication information with external network 14 and management information with controller 13 via a high-speed wired network 15. In the alternative, management information is exchanged with controller 13 over a high-speed wired network 16 that is different from network 15 which carries bearer traffic.

Typically, each terminal 12 is associated with a nearby base station 11. For example, terminals 12a and 12b are associated with base station 11a. The association may occasionally change using a well-known process called a handoff because a terminal has moved and is no longer best served by the base station with which it was previously associated.

Each terminal 12 communicates only through its associated base station 11 using a radio medium. For example, terminals 12 communicate through base stations 11 using a single radio channel operated in a time division duplex (TDD) manner. As alternatives, terminals 12 and base stations 11 use a multi-channel TDD operation or a single or multi-channel frequency division duplex (FDD) operation. For both TDD and FDD operation, the radio channel is arranged in fixed timeslots of equal size and with the timeslots aligned among all stations.

Controller 13 may be a separate processor platform, or a process operating in a selected base station 11. Alternatively, controller 13 may be realized as a process in each base station 11 with a broadcast transmission from each base station to all other base stations of forwarded request messages, downlink queue status reports, and additional messages for synchronization of the distributed coordination process.

Each base station 11 controls its own downlink transmissions to terminals associated with the base station and uplink packet transmissions from the associated terminals based on a protocol of demand-assignment type. A base station 11 transmits a permit message addressed to a specific terminal 12, instructing the terminal to send a data packet in a particular timeslot using a particular transmitter power level. Terminals inform a base station that they have data packets to send by issuing request messages. A request message, according to the invention, may be piggybacked with a transmitted data packet, that is, included as a field within a transmitted data packet if there are a plurality of data packets queued at the requesting terminal. If a new packet enters an empty terminal queue, piggybacking is not available and a random access request message must be sent for obtaining permission for transmitting the packet.

Figure 2:
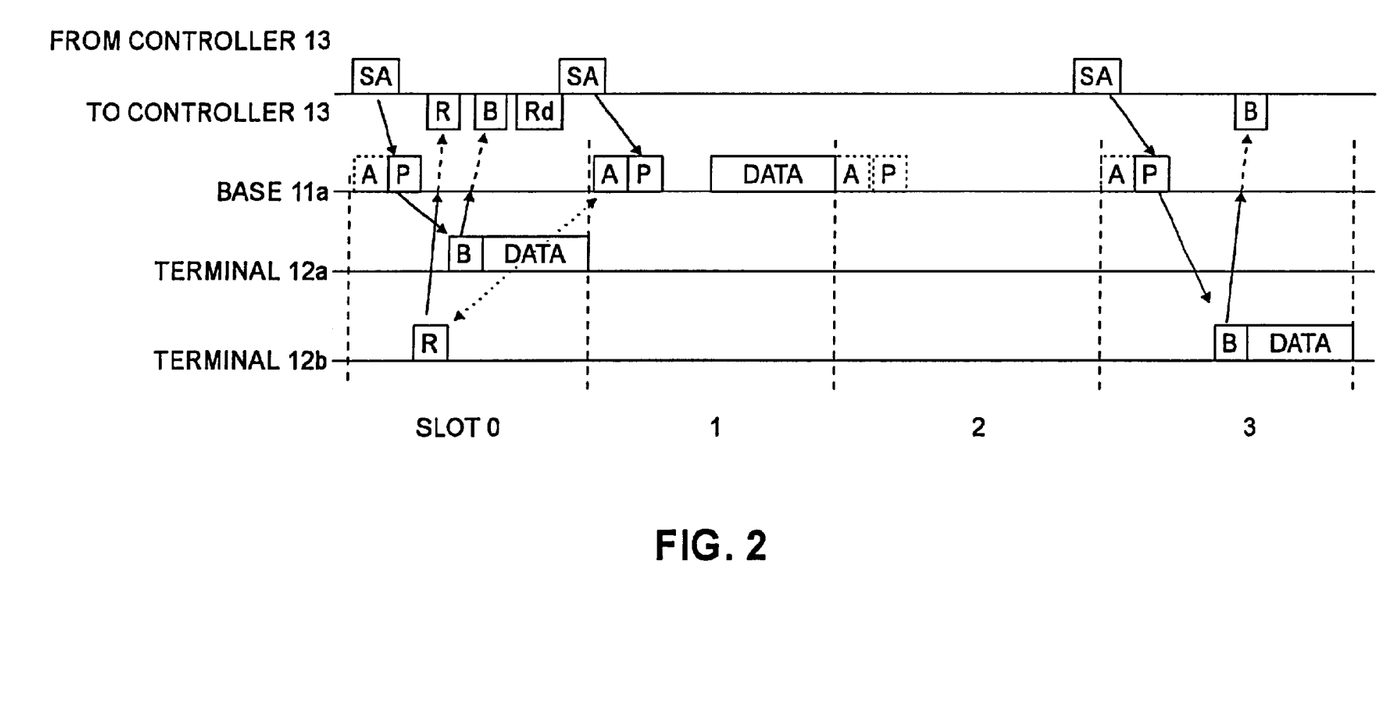
FIG. 2 shows a diagram of an exemplary sequence of events for a slot assignment for a time division duplex system having a random-access request channel according to the present invention.

FIG. 2 is a diagram showing an exemplary sequence of events for a slot assignment for a time division duplex system having a random-access request channel. Other similar sequences of events are also possible. The diagram of FIG. 2 is for a single base station, such as base station 11a, and two associated terminals, such as terminals 12a and 12b. During slot 0, controller 13 issues a slot assignment (SA) message informing base station 11a of a previously scheduled packet requested by terminal 12a. Upon receipt of the SA message, base station 11a issues a permit message P. Meanwhile, terminal 12b becomes active and has a data packet to send, so it transmits a random access request message R during the request channel. In this case, receipt of the request message R is successful and the request is immediately forwarded to controller 13. Terminal 12a receives the permit message P and transmits a piggybacked request B in the uplink with the data packet. This request is also successfully received by base station 11a and forwarded to controller 13 for a slot assignment. Lastly, controller 13 receives a downlink packet request message Rd from base station 11a indicating that a downlink packet has been received by base station 11a.

During slot 1, base station 11a issues an acknowledgement message A of receipt of the random access request message R from terminal 12b. Controller 13 schedules the downlink packet request and issues a slot assignment SA granting base station 11a permission to transmit. Neither terminal 12a or 12b sends a request message to base station 11a. Finally, base station 11a sends its packet.

During slot 2, the up/down links associated with base station 11a and terminals 12a and 12b are idle. No acknowledgement messages A are required, and controller 13 does not schedule base station 11a or either of its associated terminals for transmitting a data packet during slot 2. For example, controller 13 may have scheduled a nearby base station transmit in slot 2, such that base station 11a could not also transmit in slot 2.

During slot 3, controller 13 has scheduled the request from terminal 12b and issues a slot assignment SA message. Base station 11a issues a permit P message. Terminal 12b receives the permit message P and transmits a piggybacked request B in the uplink with the data packet. Since controller 13 is involved with scheduling requests from other base stations and terminals, the piggybacked request B from terminal 12a is not shown as having yet been scheduled in the slots illustrated in FIG. 2.

Figure 3:
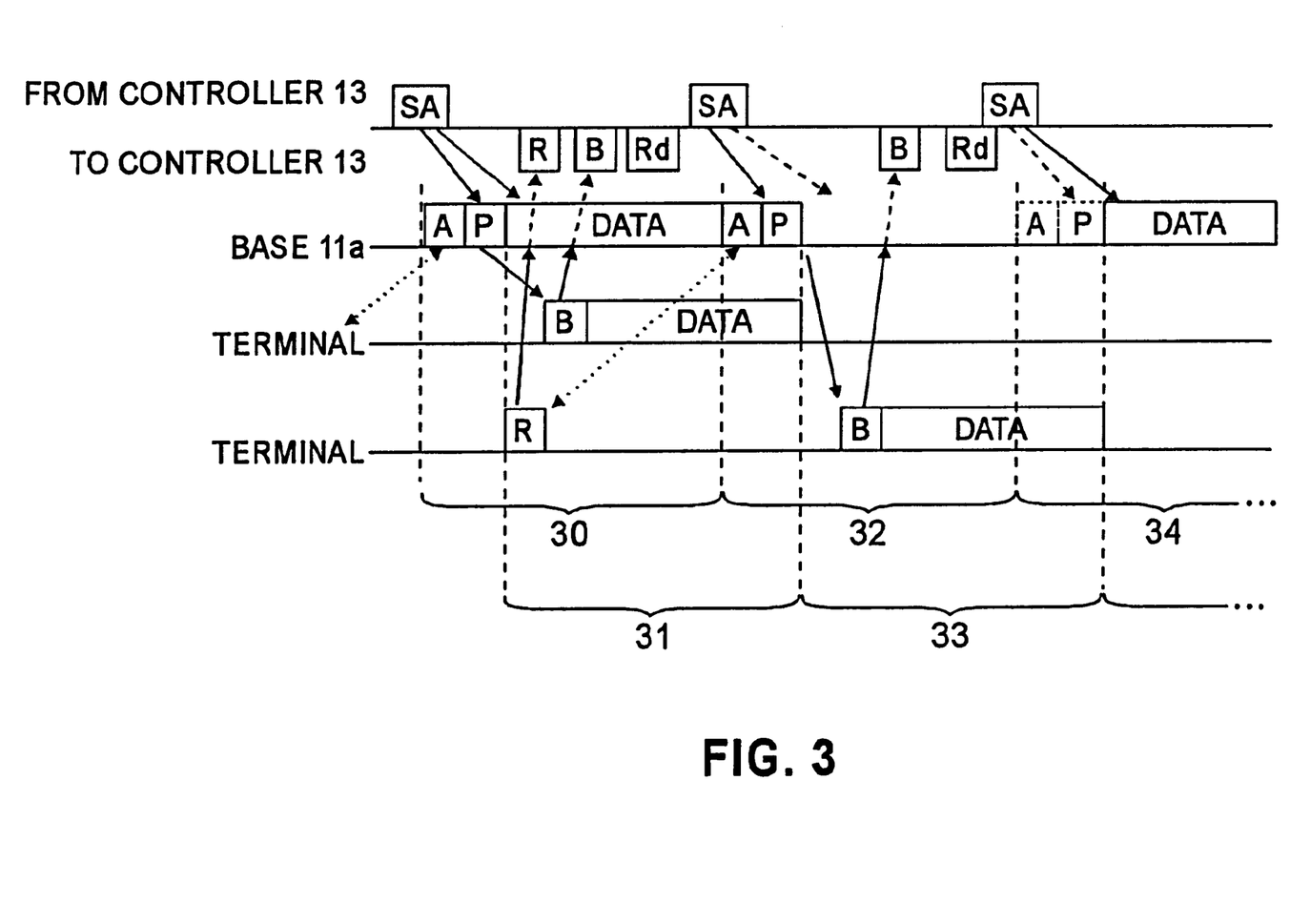
FIG. 3 shows a timing diagram for a slot assignment for a frequency division duplex system having a random-access request channel according to the present invention.

FIG. 3 shows a timing diagram of a slot assignment for a frequency division duplex system having a random-access request channel. The timing diagram of FIG. 3 is for base station 11a and associated terminals 12a and 12b. At the beginning of downlink slot 0 (30 in FIG. 3), controller 13 has previously scheduled terminal 12a for transmitting a data packet on an uplink and scheduled base station 11a for transmitting a packet on a downlink. In downlink slot 0, controller 13 issues a slot assignment (SA) message informing base station 11a of the schedule. Meanwhile, base station 11a issues an acknowledgement message A acknowledging receipt of a previous random access request message (not shown) from terminal 12a. Upon receipt of the SA message, base station 11a issues a permit message P to terminal 12a. Base station 11a transmits the downlink packet in the assigned frequency slot for the data packet. At the beginning of uplink slot 0 (31 in FIG. 3), terminal 12b becomes active and transmits a random access request message R over the request channel. During uplink slot 0, receipt of the request message R is successful and the request is immediately forwarded to controller 13. Terminal 12a receives the permit message P and transmits a piggybacked request B in the uplink with the data packet over the assigned frequency channel. This request R is forwarded to controller 13 for slot assignment. Lastly, controller 13 receives a downlink packet request message Rd from base station 11a indicating that another downlink packet has been received by base station 11a.

At the beginning of downlink slot 1 (32 in FIG. 3), controller 13 issues a permit message P for terminal 12b. Base station 11a issues an acknowledgement message A indicating that the random access request message R from terminal 12b was received in uplink slot 0. The permit message for terminal 12b, which is received by base station 11a, is forwarded to terminal 12b. Terminal 12b receives the permit message P and, at the beginning of uplink slot 1 (33 in FIG. 3), transmits a piggybacked request B in the uplink with the data packet over the assigned frequency channel.

At the beginning of downlink slot 2, controller 13 issues a permit message P for the downlink packet request Rd received from base station 11a. Base station 11a transmits the downlink packet in the assigned frequency slot for the packet during downlink slot 2 (34 in FIG. 3).

Various well-known demand-assignment protocols offer different alternatives for handling request and permit packets. For example, a request subchannel arranged as subslots of the timeslots and managed by a random access protocol, such as ALOHA, can be used. Another protocol example is polling, by which a base station sometimes issues permit packets to terminals with no known queued data packets for allowing a recently-arrived packet at a terminal to gain service. The recently-arrived packet may then include a piggybacked request if other data packets have recently arrived at the terminal.

For reuse management in multiple-base station networks, controller 13 coordinates use of timeslots so that data packet transmissions do not interfere with one another. Controller 13 first determines which base stations and terminals will transmit, and then issues slot assignment messages accordingly. The base stations in turn send permit messages to the requesting terminals. Base stations 11 forward all request messages received from terminals 12 to controller 13 and, in addition, regularly report status of downlink packet queues to controller 13.

Generally, a link can be identified with transmissions from any station to any other station in a network, whether base-station oriented or peer-to-peer. For each link there is at least one queue of packets to be transmitted in that link. If the network is connection oriented, there may be one or more connections per link with corresponding queues. For every terminal 12 there are two corresponding links, one for uplink transmissions to the associated base station 11, and one for downlink transmissions from the associated base station.

Figure 4:
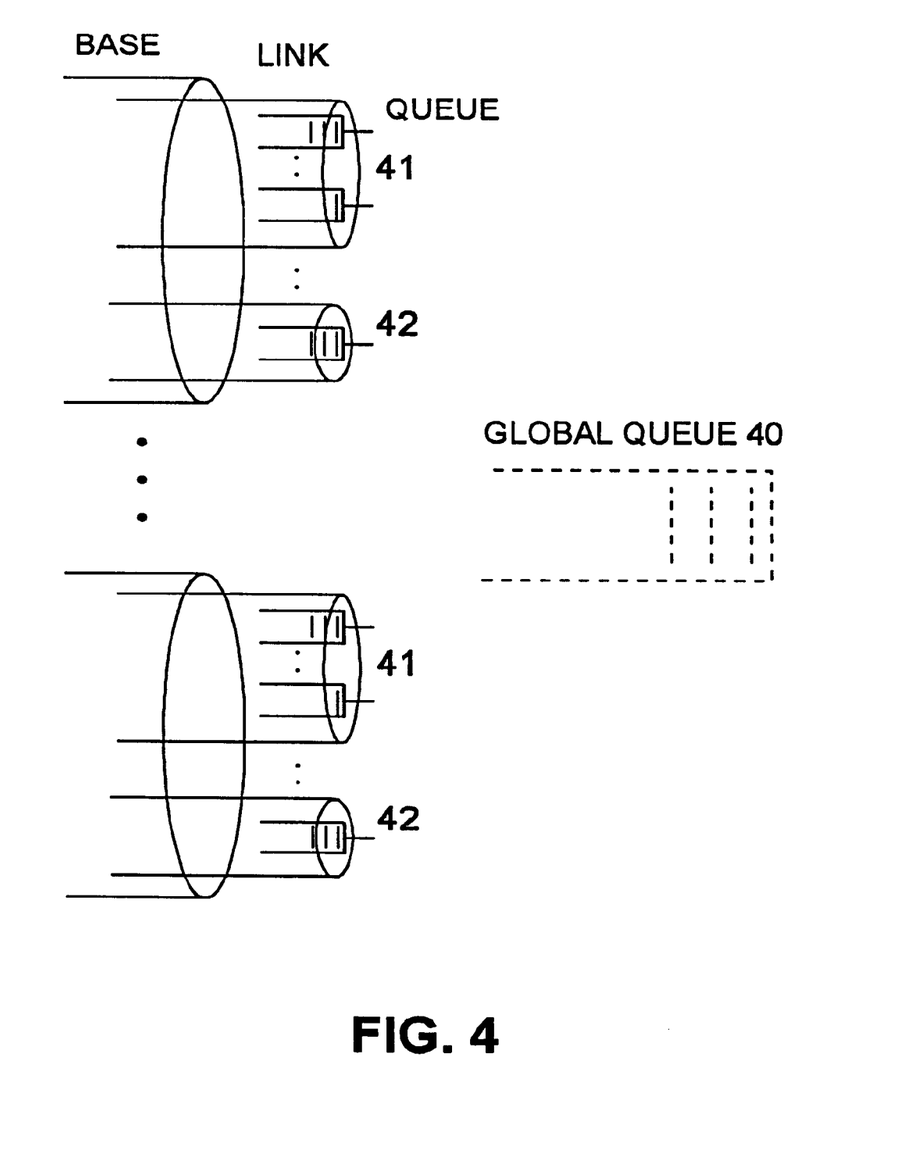
FIG. 4 diagrammically shows a token queue according to the present invention.

Controller 13 maintains information regarding all packet input queues for all base stations 11 and terminals 12. According to the invention, controller 13 keeps a token queue corresponding to each packet queue in the network. FIG. 4 diagrammically shows a token queue 40. Each base station 11 has an input queue 41 and each terminal 12 has an input queue 42. Each token in token queue 40 corresponds to a queued data packet in queues 41 and 42. In addition, each token in token queue 40 may contain information regarding, such as, for example, time-of-arrival, service deadline, the length of the packet, and other information that is useful for scheduling the corresponding packet. For some of the known assignment methods that can be used with the present invention, controller 13 also maintains a listing of all tokens in some given order, called a global queue. If the listing is configured based on order-of-arrival, it is called a global FIFO queue. It is often desirable to serve the queued packets in order of the global queue or a closely-related order. If need be, the packets of each individual input queue are re-ordered for consistency with the order of the global queue, though in a connection-oriented network, global ordering is not permitted to perturb the order in each connection.

For each time slot, controller 13 selects a set of base stations and terminals that will transmit their respective first queued packets. The selection is based on a compatibility relationship so that the data packets in the selected set are all capable of simultaneous successful transmission. That is, the combined interference appearing at an intended receiver of a particular selected packet caused by the transmissions of the other selected packets must not cause reception failure of the particular packet. Errors in digital radio communications cannot be exactly predicted because of the statistical nature of the environment. Successful transmission for purposes of the present invention should be understood to mean a high probability of successful transmission.

Most generally, compatibility depends on the locations of the stations forming the link end-points, the radio propagation conditions among those stations, and characteristics of the data packets themselves, such as, for example, their length, manner of error protection, their importance to the application they are serving, and the required probability of successful transmission. In many situations, all the data packets will have the same characteristics so compatibility depends only on the set of links to which the queues belong. In many situations successful transmission is determined by the transmission power level. That is, a set of links can often be made compatible by selection of transmission power levels that are each possibly different.

The interference caused to one packet transmission by other packet transmissions of a set of links may be caused almost entirely by just one other packet transmission. If a dominant single interfering transmission occurs in most situations, a useful approximation is that a set of links i is compatible whenever every pair of member links is compatible. This pairwise definition of compatibility underlies graph theoretic independent-set models for reuse management in wireless networks, which have been conventionally defined for base-to-base compatibility. That is, some conventional systems have defined compatibility among base stations. Such base station compatibility is related to link compatibility by the base stations being compatible if every set of links involving those base stations is compatible. Under this definition of compatibility, it is common that many sets of links are compatible, yet the base stations to which those links belong are not compatible because other links belonging to those base stations are not compatible.

In wireless networks with reuse, and particularly operating in a single channel, packet transmission success is commonly thought to be determined at a receiver by a ratio of the power level of the desired signal to the cumulative power of other signals being transmitted at the same time. This ratio is typically called the signal-to-interference ratio (SIR). If the transmission path gain between every transmitter and every receiver is known or estimated, and the transmission power levels are known, then transmission success can be known or predicted. Such path-gain information is often called the path-gain matrix.

Figure 5:
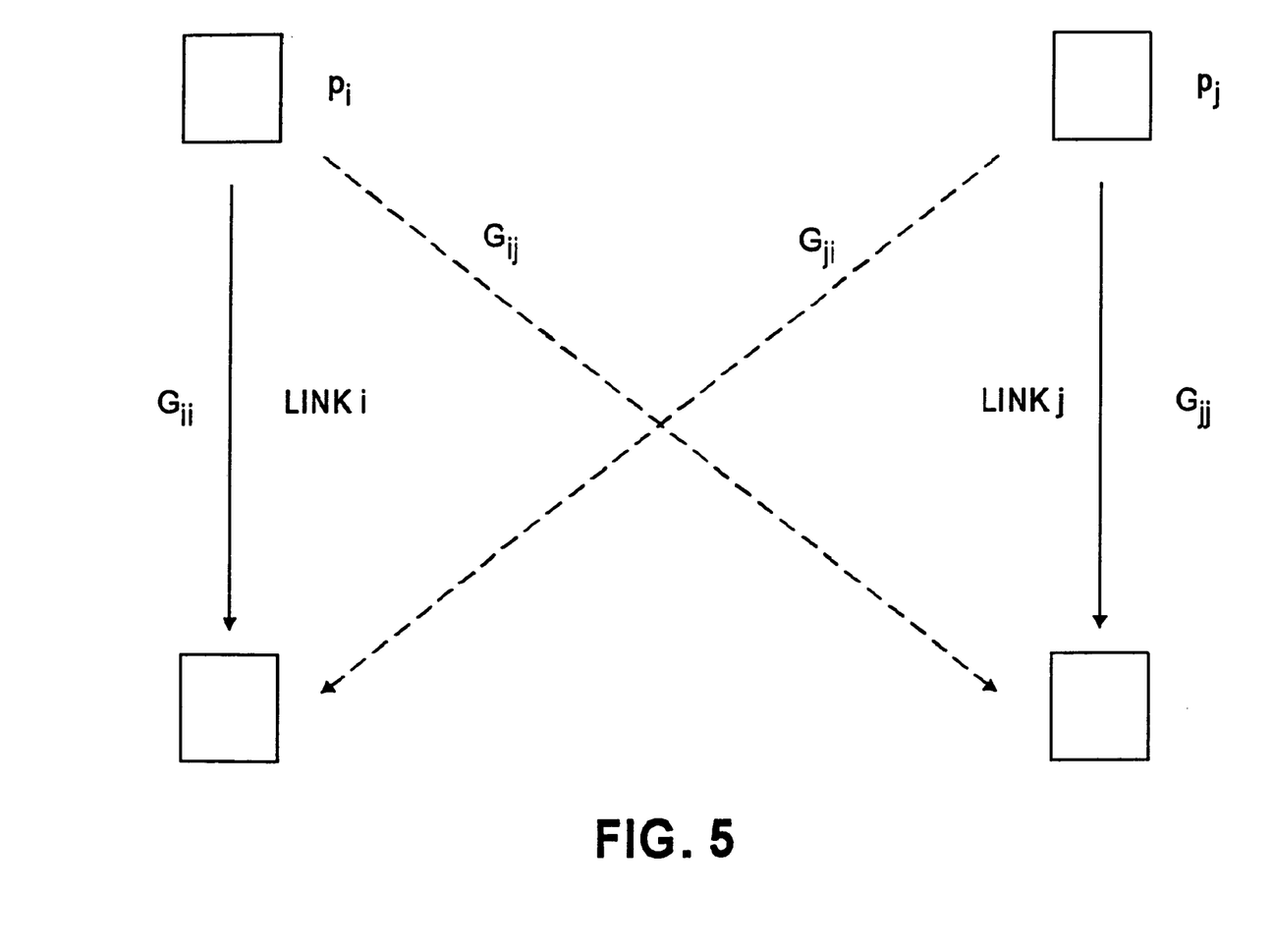
FIG. 5 shows an exemplary graphical model for determining link compatibility as used by the present invention.

A typical graph model for resource allocation identifies the links as vertices and pairs of interfering links as edges of the graph. An admissible assignment of a link to a timeslot corresponds to an independent set in the graph, that is, a set of vertices in which no pair is joined by an edge. This approach supports peer-to-peer networks as well as the base-station-oriented networks. Global packet dynamic resource allocation according to the present invention derives graph models for connections and for queued packets by inheritance from their parent links. FIG. 5 shows an exemplary graphical model for determining link compatibility. For the graphical model of FIG. 5, it is assumed that a receiver can accept only a single packet at a time, and that a transmitting station cannot receive at the same time.

For the purpose of determining interference relationships, that is, link compatibility, base stations 11 and terminals 12 measure and report received signal-strength indications (RSSI) to controller 13. The measurements are managed so that controller 13 always has an accurate measurement of the propagation path gain between every pair of stations (terminals and base stations) in the network. A link is identified as an ordered pair of stations, and when the link is active, the first station of the pair is transmitting a packet intended for the second station of the pair. In FIG. 5, the link path-gain matrix $G_{ij}$ is the path gain from the transmitter of link i to the receiver of link j. The effective radiated power level from the transmitter of link i by $p_i$. The required signal-to-interference ratio (SIR) for successful packet transmission is chosen to be y. In determining whether links i and j interfere, controller 13 determines whether $G_{ii}/G_{ji} < \gamma$ or $G_{jj}/G_{ij} < \gamma$. Since different data packets might have different error-protection or error-probability requirements and correspondingly different SIR thresholds, controller 13 is capable of accommodating different SIR thresholds for each data packet.

A graph model approach depends on pairwise interference relationships. However, as mentioned, interference is more accurately considered to be cumulative. Thus, a set J of links is mutually non-interfering if, for all i in J, $(G_{ii}/\Sigma_{j \neq i} G_{ji}) < \gamma$. The substantial body of work on graph-model based channel assignment relies on an approximation that the cumulative interference is dominated by a maximum component, so that the pairwise and cumulative formulations are equivalent. The statistical distributions of path gains are often assumed to be lognormal or Rayleigh, which are skewed and quite heavy-tailed and so would justify the assumption. One particular graph-model based compatibility determination approach readily adapts to interference accumulation, as will be seen below. Generally speaking, the present invention uses a pairwise graph model for determining link compatibility.

In some methods of reuse management, a controller decides compatibility of each pair of links, and then assigns several links to be active in a timeslot, as long as every pair of links is compatible. For this purpose, a pair of links i and j is compatible if the ratios $p_i G_{ii}/p_j G_{ji}$ and $p_j G_{jj}/p_i G_{ij}$ both exceed the required SIR level. In other methods of reuse management, a controller decides compatibility directly for a possible set of active links so that for each link the ratio of the desired-path-gain to the sum of all interference-path-gains, $p_i G_{ii}/\Sigma_{j \neq i} p_j G_{ji}$, must exceed the required SIR level.

In the present invention, controller 13 maintains input queues, possibly a token or global queue, and link-compatibility information. Controller 13 also acquires and maintains a path-gain matrix and decides compatibility of links by SIR calculations. To assign or schedule transmissions for a timeslot, one reuse management approach that can be used with the present invention is to find a maximum compatible set of links, that is, a compatible set of links of maximum size among all the packets in the global queue at the time the set is determined. If controller 13 uses pairwise compatibility, this is the same as finding a maximum independent set in a link graph. If two or more queues share a link in this set, one of the queues is chosen arbitrarily. This is a well-known problem in the literature of combinatorial optimization, and although exact solutions are impractical for large graphs, approximate algorithms of good performance are known. Maximum compatible set algorithms are less well-known for non-pairwise methods.

A likely system benefit for a maximum independent set approach is high throughput, since a maximum compatible set is selected in each timeslot. A possible disadvantage of this reuse management approach is when all links have queue packets, only links belonging to a maximum independent set will be allowed to transmit packets, resulting in a problem commonly known as starvation.

Another reuse management approach that can be used with the present invention is to schedule data packets in strict order of the global queue, as many as are mutually compatible in each timeslot. In other words, each link is selected for inclusion in the set as long as it is compatible with other links that have already been selected for the set. When a link is encountered that is not compatible with any link already in the set, the set is closed and the selected links are scheduled. This method avoids starvation, assuming the supplied global queue order also avoids starvation, and more generally retains the priority decisions that may have been made for composing the global queue. This approach has an advantage of a simple algorithm, but a disadvantage of likely low throughput, since the first incompatible packet encountered in the determination of the set ends the schedule for a timeslot.

Another reuse management approach is selecting a list of packets for a timeslot by considering all packets in global queue order, and adding a packet to the selected list if it is compatible with the current list. This approach, called sequential assignment with respect to the global queue, generally provides scheduling of every packet at least as early as the packet would receive if a strict global queue order were followed. This reuse management approach, like strict global queue order, can be implemented exactly with simple algorithms. It is likely to have much higher throughput than strict global queue order, but perhaps not as high as maximum compatible set.

Figure 6:
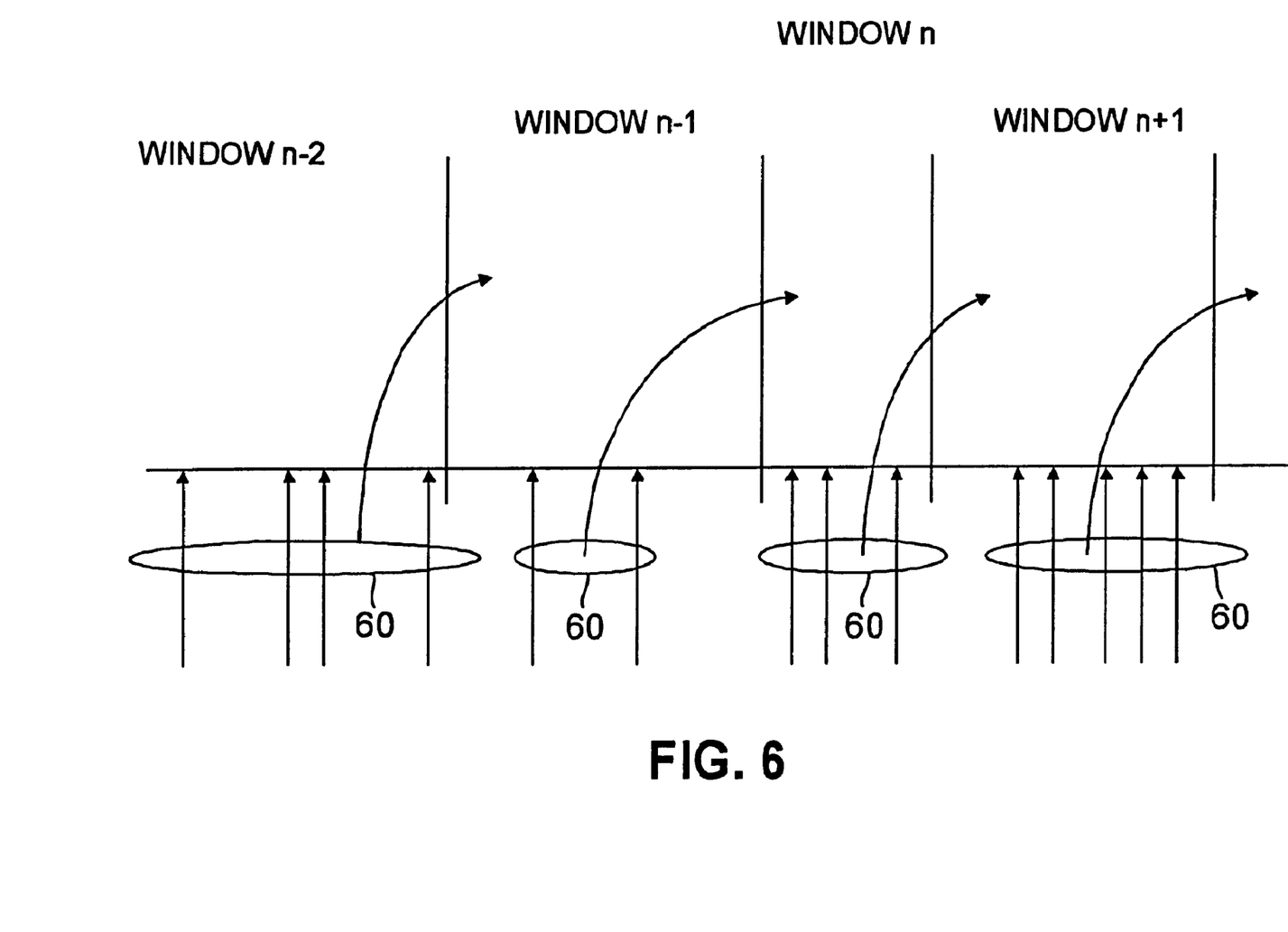
FIG. 6 shows an exemplary windowing reuse management approach that can be used with the present invention.

Yet another reuse management approach that can be used with the present invention is a windowed minimum coloring approach. For this approach, all packets present in the global queue in an initial time slot are partitioned into a minimum possible number of compatible sets. In the pairwise compatibility method, these are independent sets, and the solution is known as minimum coloring. FIG. 6 shows an exemplary windowing approach that can be used with the present invention. A compatible set of packets 60 that are present in window n-2 is scheduled for transmission in the subsequent window, window n-1. When the set of compatible packets have been transmitted, the current window is closed, and all packets present in the global queue are again partitioned for transmission in the next window. This process is repeated ad infinitum. The windows may vary in length from 1 timeslot upward without limit. Minimum coloring is a well-known problem, and although exact solutions are impractical for large problems, approximate algorithms with good performance are available.

Windowed minimum coloring provides a service order that is related to the global queue order. Every packet present in the global queue at the beginning of one window is served before any packet that arrives in the global queue after the beginning of that window. When there is little congestion, a window minimum coloring approach provides service that is close to strict global queue order. However, when there is congestion, windowed minimum coloring likely will provide a high throughput.

An enhanced windowed minimum coloring reuse management approach allows packets that arrive in the global queue after a window starts and be included in the schedule of the present window if inclusion of the packet can be done without violating compatibility or increasing the number of timeslots required for the present window. Although the window-to-window service order characteristic of packets may be violated, no packet in the enhanced method is served in a window later than the one in which it is served in the basic window method.

The following pseudocode, in the style of C-type programming language, specifies the various exemplary reuse-management methods described above:

```
Data structures:
schedule:              list of packets to be transmitted in this timeslot
global_queue:          list of queued packets, not yet scheduled
partition[ ]:          array of lists of packets
number_of_colors:      number of lists in partition
Functions:
logical:               set_compatible ( list of packets )
#   returns 1 if the packet list is mutually compatible, 0 if # not in
pairwise version, is equivalent to logical AND of
#   pair_compatible values for every distinct pair of
packets in #  the # list
logical                pair_compatible ( packet1, packet2 )
#   returns 1 if packet1 and packet2 are compatible
void                   remove_from_global_queue (packet)
#   removes this packet from global_queue
void                   add_to_global_queue()
#   an external process that adds packets to global_queue
list of packets        maximum_compatible_set ( list of packets )
#   finds a compatible subset of the list, of maximum size
partition              minimum_coloring (list of packets)
#   finds a partition of the list, of minimum size, into
#   compatible sets; also sets number_of_colors
void                   next_time_slot( )
#   advances timeslot
Strict global queue order:
for( each timeslot )
    schedule = { }
    for( each packet in global_queue, in order )
        if( set_compatible( schedule U {this packet} ) )
            schedule = schedule U {this packet}
            remove_from_global_queue( this packet )
        else
            stop
add_to_global_queue( )
Sequential:
for( each timeslot )
    schedule = { }
    for( each packet in global_queue, in order )
        if( set_compatible( schedule U {this packet} ) )
            schedule = schedule U {this packet}
            remove_from_global_queue( this packet )
    add_to_global_queue( )
Maximum compatible set:
for( each timeslot )
    schedule = maximum_compatible_set( global_queue )
    for( each packet in schedule )
        remove_from_global_queue( this packet )
add_to_global_queue( )
Windowed minimum coloring:
for( )
    partition [1 ... number_of_colors] = minimum_coloring
        ( global_queue )
    global_queue = { }
    for( index = 1 to number_of_colors )
        schedule = partition [index]
        add_to_global_queue( )
        next_time_slot( )
Enhanced windowed minimum coloring (example):
for( )
    partition [1 ... number_of_colors] = minimum_coloring
        ( global_queue )
    global_queue = { }
    for( index = 1 to number_of_colors )
        schedule = partition[index]
        for( each packet in global_queue, in order )
            if(set_compatible( schedule U {this packet} ) )
                schedule = schedule U {this packet}
                remove_from_global_queue( this packet )
        add_to_global_queue( )
        next_time_slot( )
```

As mentioned, transmitter power control is often applied in wireless systems for reducing interference and increasing reuse possibility. Wireless systems often adjust transmitter power on the basis of the path gain of the desired communication link itself. For example, the transmitter power can be adjusted for achieving a fixed, target RSS level at the desired receiver. Any power control approaches achieving a desired path gain can be used with the present invention.

For pair-wise compatibility decisions, transmit power levels can be selected to make some pairs compatible that would otherwise be incompatible. Specifically, each pair-wise compatibility is equivalent to an interval in which the ratio of power levels must fall. That is, $$\frac{p_i G_{ii}}{p_j G_{ji}} > \text{required } SIR \Leftrightarrow \frac{p_j}{p_i} < \frac{G_{ii}}{\text{required } SIR \cdot G_{ji}}$$

If the interval is not empty, then links i and j are compatible after power control. Mutual $$\frac{p_j G_{jj}}{p_i G_{ij}} > \text{required } SIR \Leftrightarrow \frac{p_j}{p_i} > \frac{\text{required } SIR \cdot G_{ij}}{G_{jj}}$$

compatibility of a set can be determined by enumerating and checking all implied inequalities.

Other well-known methods of optimal power control based on cumulative interference for wireless systems can be used with the present invention for determining compatibility of a set of links with power control. For example, see J. Zander, "Near-optimum transmitter power control in cellular radio systems," IEEE Trans. Vehic. Tech., vol. VT-41, no. 1, pp. 57–62, 1992; and G. J. Foscinni, "A simple distributed autonomous power control algorithm and its convergence," IEEE Tran. Vehic. Tech., vol. 42, no. 4, pp. 641–646, Nov. 1993.

The path-gain matrix with entries $G_{ij}$ are filled and maintained for performing the compatibility determinations by controller 13. Even when terminals 12 are stationary, path gains vary over time as nearby people and objects move with respect to a terminal.

According to the invention, uplink (terminal-to-base) path gains are estimated by one of a number of approaches. If the wireless network operates in a TDD mode, the uplink path gains are the same as downlink path gains. If the network operates in a FDD mode, the downlink path-gains may differ based on frequency differences. For FDD operation, controller 13 may also schedule test signals for measuring downlink path gains, but terminals must report any such measurements using the wireless network itself. Alternatively, the controller may estimate the downlink path gains on the basis of corresponding uplink measurements, but a margin of safety may need to be included in SIR calculations for accommodating uncertainty of the estimates.

One approach for maintaining path-gain estimates is based on periodically scheduled test signals. Controller 13 schedules test signals from the terminals 12 so that (1) each terminal sends a signal at least once in any time interval equal to the period, $T_{test}$, and (2) while a terminal is transmitting the test signal, no other station is transmitting.

Each base station 11 makes a received signal strength (RSS) measurement during the expected time of the test signal, and reports the result to controller 13. For each base station 11, controller 13 calculates the path gain as the ratio of the reported RSS measurement to the transmitter power level of a terminal. Controller 13 then updates the path-gain estimate for each base station and the terminal sending the test signal. Of course, an estimation method should be based on an assumed model for time evolution and statistical variation of path gains. Many such well-known methods are available regarding estimation and control of stochastic processes and systems that can be used with the present invention.

The test signal may be defined to include status reports or other control information, or may merely be a data packet. At the time a particular terminal is scheduled for sending a test packet, controller 13 first examines the global queue for packets ready to be sent by the terminal. If any are found, the first data packet queued at the terminal is scheduled in the test slot, a permit message is issued and sent to the terminal, and the queued packet is then taken out of the global queue. If no such packet is found, a permit message is issued for a test packet.

Alternatively, the test signal may be a specially-designed signal, shorter than a packet, but long enough for a reliable RSS measurement. Such a test signal may require only about 50 bits, for example, while a data packet may require about 1000 bits, for example. Explicit scheduling of test permits may, nevertheless, take 100's of bits including overhead. Fixed periods, with occasional negotiation of specifics, might make implicit scheduling possible. The present invention can even include a separate test-signal channel as part of a super frame. If the system of the present invention is configured with is a separate request channel, test messaging might be embedded in the request channel.

Yet another approach for scheduling test packets is integrating the test signal into normal-traffic scheduling. For example, controller 13 initially sets all the path gains $G_{ii}=0$, and $G_{ij}$=HUGE, if j=i. The meaning of HUGE is that any SIR calculation must indicate incompatibility if at least one HUGE component is included in the interference. Similarly, when the desired-signal level is 0, the result must indicate incompatibility. This initialization prevents any reuse until the relevant path gains are measured.

When the assignment for a timeslot includes a single packet from a terminal, for example, in link i, controller 13 treats that packet as a test packet, as describe above. After the base stations report their RSS values, the controller calculates the path gains and replaces previous values of those path gains estimates, including HUGE and 0, with new calculations. Controller 13 then sets the path-gain estimate timer for link i to expire at time $T_{test}$ later. Whenever a path-gain estimate timer expires, for example for link i, controller 13 resets the stored path-gain elements $G_{ij}=0$, and $G_{ij}$=HUGE, if j≠i, as shown above. Controller 13 will not allow any reuse with link i. When a packet in link i appears in the global queue, controller 13 will eventually schedule only that packet in a timeslot so that it will be a test packet and the path-gain elements will be refreshed.

Scheduling of test signals for one-at-a-time transmission may be inefficient for a practical system. An alternative test-signal method is to partition terminals into sets that can be measured at the same time, and then updates for each terminal are limited to base stations where it is predicted that the terminal will make a significant contribution to the measured level.

Alternatively, controller 13 may use a continuous stochastic control method. Base stations 11 report RSS levels in every timeslot, and controller 13 maintains a history of reported RSS levels, the schedule of active links, and terminal transmission powers in all previous timeslots. For this approach, $G_{ij}^{(k)}$ is defined as the path gain from terminal transmitter in link i to base-station receiver in link j at time of slot k. $S_j^{(k)}$ is defined as the total signal strength measured and reported by base-station receiver j in slot k. $P_j^{(k)}$ is defined at the transmit power of transmitter in link i in slot k, which is set to 0 if link is not active, as determined by controller 13. Then, $$S_j^{(k)} 32\ \Sigma P_i^{(k)} G_{ij}^{(k)} + \text{error}_j^{(k)}$$

or $$S^{(k)} = G^{(k)} P^{(k)} + \text{error}^{(k)}, k=1, \ldots, K$$

Each $G_{ij}^{(k)}$ is a sample from a continuous time process, often thought to be Rayleigh process, or the product of Rayleigh and Lognormal processes.

Techniques of stochastic control can be applied in the present invention in several ways. For example, estimate $G^{(k+1)}$ and use the estimates in further compatibility decisions. This requires periodic test packets for guaranteeing the quality of the estimate. Another example is to determine the conditional distribution of $G^{(k+1)}$ and define link compatibility or set compatibility as a packet failure probability less than a small number with respect to the conditional distribution. The reuse management approaches can then be applied to the present invention as previously described. Yet another example is to use adaptive sequential sampling methods, in which the value of information for future timeslots obtained about path gains through observations in the current timeslot, is balanced against throughput in the current timeslot.

Figure 7:
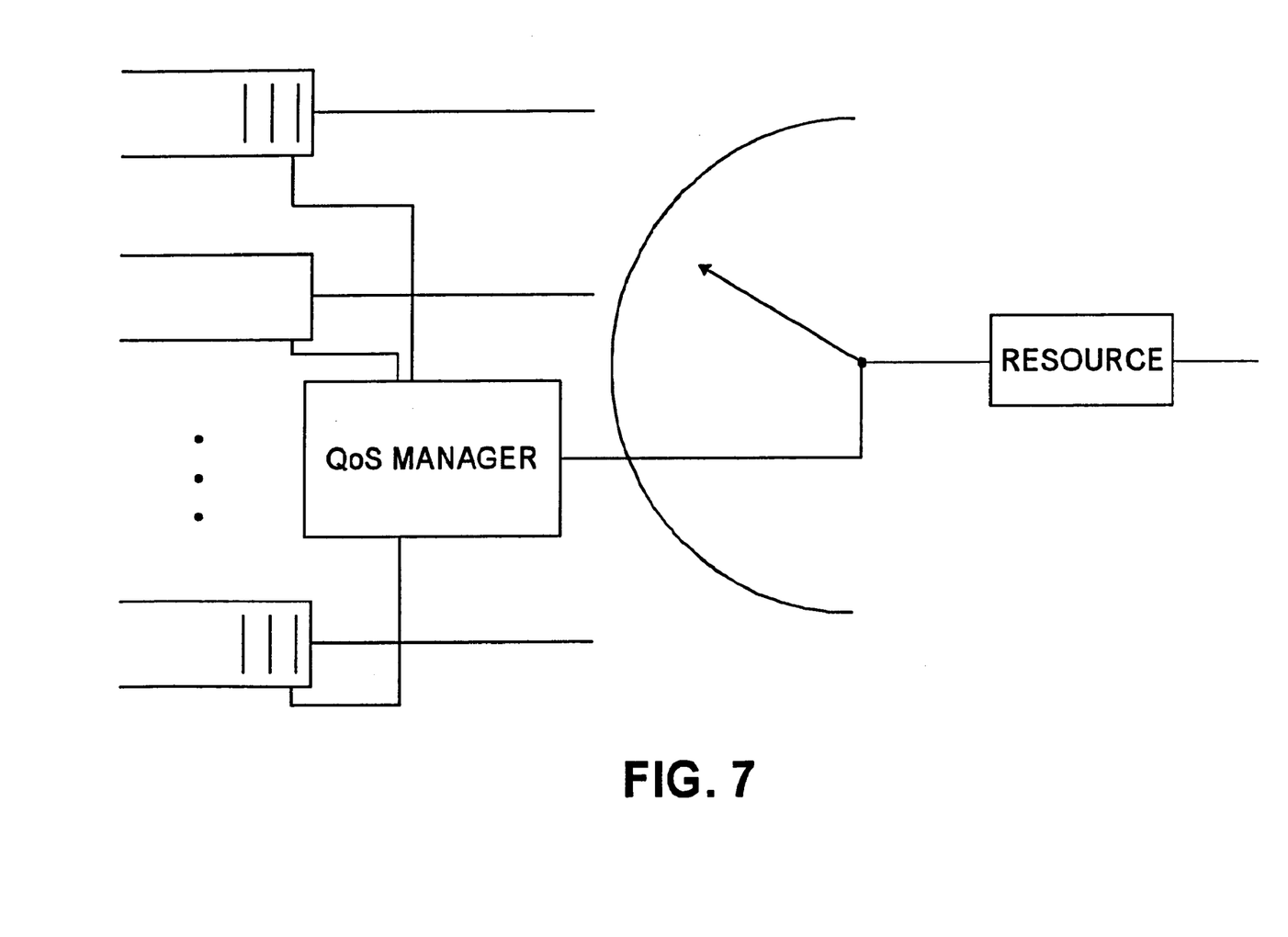
FIG. 7 shows an exemplary quality of service manager providing service to a single resource.

The present invention also provides a quality of service (QoS) for a packet switched wireless network. Many approaches have been proposed for managing delay quality-of-service for several queues of jobs, where service is provided to each job by a resource. The resource may be, as an example, the CPU of a computer, and the jobs are programs or processes that require access to the CPU for a certain time. FIG. 7 shows an exemplary quality of service manager providing service to a single resource. In packet communications networks, the resource may be a transmission link, and jobs are packets that need to be transmitted across the link. In most conventional QoS management approaches, the resource is assumed to have a known service rate, or is assumed to inform the quality-of-service manager when the present job has been completed and the next job can be submitted for service.

For the present invention, a quality-of-service manager follows a service policy for determining which packet will receive service next. For example, a FIFO policy serves jobs in order of arrival; an earliest-deadline policy serves jobs in order of "deadline times" attached to each job; a round-robin policy serves the queues in a fixed, cyclic order; and a non-preemptive priority policy assigns to each queue a priority level, and serves a queue only when all queues of greater priority are empty.

Wireless networks with a reuse management aspect involve multiple resources, some of which interfere with each other, and so cannot each be managed independently by one of the aforementioned service policies. The present invention approaches wireless networks by forming a joint quality-of-service and reuse management policy. This provides an advantage that allows design optimization for both purposes.

Figure 8:
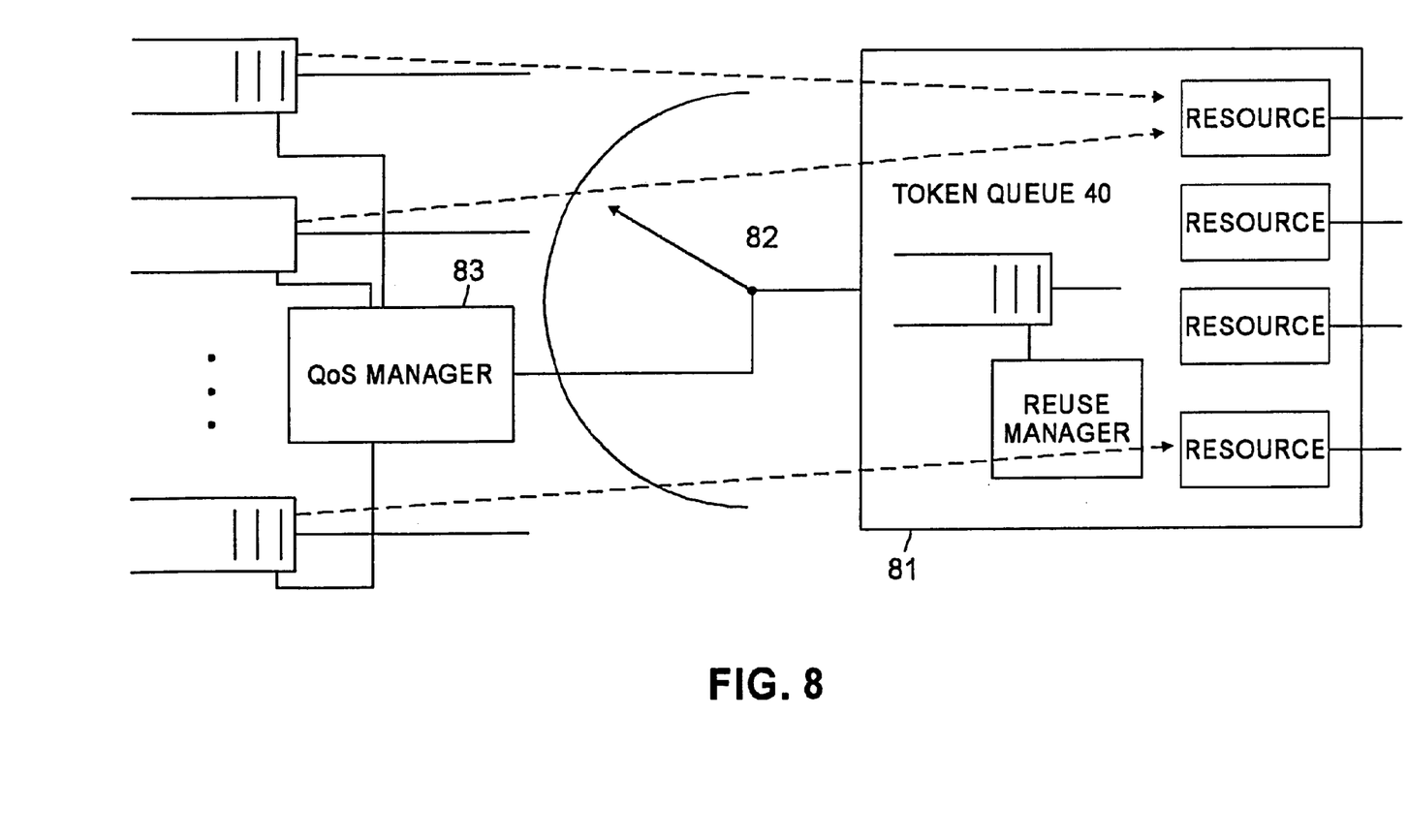
FIG. 8 shows an exemplary configuration of a QoS manager and a reuse manager providing service to a wireless network according to the present invention.

One joint QoS and reuse management approach of the present invention, called a virtual resource interface, allows the service policy methods for single resources to be used together with any of the reuse management approaches that can be used with the present invention, and with any reuse management approach that uses a global queue. FIG. 8 shows an exemplary configuration of a joint QoS manager and reuse manager providing service to a wireless network according to the present invention. FIG. 8 shows that the reuse-managed wireless network is represented by a virtual resource 81 having a global token queue 40 and a virtual service rate, and with an interface 82 between the global token queue 40 and an QoS manager 83.

The reuse of the connections or queues, links, are maintained by a central controller 13, as already described above in connection with the reuse management aspect of the present invention. Both a QoS management policy and a reuse management policy are selected for jointly operating on the entire set of connections in the wireless network. The QoS manager 83 implements a service policy to place tokens for packets in global token queue 40, as previously described. For example, a round-robin policy can be used for placing tokens for packets in the global queue 40, while the sequential reuse-management policy can be used by controller 13 for serving the packets placed in the global queue. For this example, the instances at which QoS manager 83 can place packets in the global queue 40 are governed by:

A packet can be placed in global queue 40 only when the global queue is not full.

A packet can be placed in global queue 40 whenever it is empty.

When global queue 40 is partially full, packets can be placed in global queue 40 at no greater than the virtual service rate.

Variations of the last rule are possible. For example, the virtual service rate can be set according to the fraction of the global queue that is filled.

The virtual service rate represents the ability of the entire wireless network to serve packets. The virtual service rate should be set so that the global queue does not fill often, the delay in actual service to a packet is not very large after it is placed in the global queue, and as high a rate as possible within those constraints.

While the present invention has been described in connection with the illustrated embodiments, it will be appreciated and understood that modifications may be made without departing from the true spirit and scope of the invention.

What is claimed is:

1. A method of reuse management for a medium comprising a plurality of wireless links in a packet switched wireless network, each wireless link comprising a connection between one of plural terminal devices and one of plural base stations, the method comprising the steps of:

receiving at least one request for a link in the medium for transmitting a data packet, including at least one request, which if granted, would result in medium reuse; and granting the at least one request for transmission of a data packet over the requested link based on compatibility of the requested link with other links in the medium.

2. The method according to claim 1, wherein the step of granting permission to transmit the data packet includes the step of assigning a slot for transmitting the data packet over the requested link.

3. The method according to claim 2, further comprising the steps of:

transmitting the request at the terminal device;

receiving the request at the base station; and assigning the slot for transmitting the data packet over the requested link based on a signal-to-interference ratio for successful transmission of the data packet over the requested link.

4. The method according to claim 3, further comprising the steps of:

sending the request received at the base station to a controller; and assigning the slot for transmitting the data packet over the requested link at the controller.

5. The method according to claim 4, wherein transmitting the data packet includes the step of transmitting another request with the transmitted data packet, the request for transmitting another data packet over the link in the medium.

6. The method according to claim 4, wherein the slot is one of a time slot in a time-division duplex system and a frequency slot in a frequency-division duplex system.

7. The method according to claim 4, further comprising the steps of:

sending the slot assignment from the controller to the base station;

transmitting the slot assignment from the base station to the terminal device; and transmitting the data packet from the terminal device to the base station in the assigned slot over the requested link.

8. The method according to claim 7, wherein the step of receiving the request for the link includes the step of receiving a plurality of requests, each request being for a link in the medium for transmitting a data packet, each requested link being a wireless connection between a terminal device of the plurality of terminal devices and a base station of the plurality of base stations, and wherein the step of assigning a slot for transmitting the data packet includes the steps of:

determining, in order of receipt of the requests, whether a requested link is compatible with links previously assigned the slot;

assigning the slot to a requested link when the requested link is compatible with other links previously assigned the slot;

terminating determination of whether a requested link is compatible with links previously assigned the slot when a link is determined to be incompatible with links previously assigned the slot; and sending the slot assignment for the requested links to the respective base stations.

9. The method according to claim 8, further comprising the steps of:

determining from all received requests whether a transmit power level associated with a respective requested link makes the respective requested link compatible with other requested links;

assigning the slot to a requested link when the link has a transmit power level making the requested link compatible with other requested links; and sending the slot assignment for the requested links and the respective transmit power levels for each requested link to the respective base stations.

10. The method according to claim 7, wherein the step of receiving the request for the link includes the step of receiving a plurality of requests, each request being for a link in the medium for transmitting a data packet, each requested link being a wireless connection between a terminal device of the plurality of terminal devices and a base station of the plurality of base stations, and wherein the step of assigning a slot for transmitting the data packet includes the steps of:
determining, in order of receipt of all requests, whether a requested link is compatible with other requested links previously assigned the slot;
assigning the slot to a requested link when the requested link is compatible with other links previously assigned the slot;
terminating determination of whether a requested link is compatible with other requested links when compatibility for all requested links has been determined; and
sending the slot assignment for the requested links to the respective base stations.

11. The method according to claim 10, further comprising the steps of:
determining from all received requests whether a transmit power level associated with a respective requested link makes the respective requested link compatible with other requested links;
assigning the slot to a requested link when the link has a transmit power level making the requested link compatible with other requested links; and
sending the slot assignment for the requested links and the respective transmit power levels for each requested link to the respective base stations.

12. The method according to claim 7, wherein the step of receiving the request for the link includes the step of receiving a plurality of requests, each request being for a link in the medium for transmitting a data packet, each requested link being a wireless connection between a terminal device of the plurality of terminal devices and a base station of the plurality of base stations, and wherein the step of assigning a slot for transmitting the data packet includes the steps of,
determining from all received requests whether a respective requested link is compatible with other requested links;
assigning the slot to a maximum independent set of requested links that are mutually compatible; and
sending the slot assignment for the requested links to the respective base stations.

13. The method according to claim 12, further comprising the steps of:
determining from all received requests whether a transmit power level associated with a respective requested link makes the respective requested link compatible with other requested links;
assigning the slot to a requested link when the link has a transmit power level making the requested link compatible with other requested links; and
sending the slot assignment for the requested links and the respective transmit power levels for each requested link to the respective base stations.

14. The method according to claim 7, wherein the step of receiving the request for the link includes the step of receiving a plurality of requests, each request being for a link in the medium for transmitting a data packet, each requested link is a wireless connection between a terminal device of the plurality of terminal devices and a base station of the plurality of base stations, and wherein the step of assigning a slot for transmitting the data packet includes the steps of:
determining, from all requests received during a time window, whether a requested link received during the time window is compatible with other requested links received during the time window;
assigning the slot to a requested link when the requested link is compatible with other links previously assigned the slot;
terminating determination of compatibility of the links when compatibility of all link requests received during the time window has been determined; and
sending the slot assignment for the requested links to the respective base stations.

15. The method according to claim 14, further comprising the steps of:
determining from all received requests whether a transmit power level associated with a respective requested link makes the respective requested link compatible with other requested links;
assigning the slot to a requested link when the link has a transmit power level making the requested link compatible with other requested links; and
sending the slot assignment for the requested links and the respective transmit power levels for each requested link to the respective base stations.

16. The method according to claim 7, wherein the step of receiving the request for the link includes the step of receiving a plurality of requests, each request for a link in the medium for transmitting a data packet, each requested link being a wireless connection between a terminal device of the plurality of terminal devices and a base station of the plurality of base stations, and wherein the step of assigning a slot for transmitting the data packet includes the step of:
determining from all received requests whether a transmit power level associated with a respective requested link makes the respective requested link compatible with other requested links;
assigning the slot to a requested link when the link has a transmit power level making the requested link compatible with other requested links; and
sending the slot assignment for the requested links and the respective transmit power levels for each requested link to the respective base stations.

17. The method according to claim 4, further comprising the steps of:
measuring a received signal-level at the one base station;
determining a propagation path gain of the requested link between the terminal device and the one base station using the received signal-level measured at the base station; and
determining the compatibility of the requested link with other links in the medium based on the determined propagation path gain of the requested link.

18. The method according to claim 17, further comprising the step of measuring a received signal-level at the terminal device, and wherein the step of determining a propagation path gain of the requested link is further based on the received signal-level measured at the terminal device.

19. The method according to claim 17, further comprising the steps of:
determining a transmit power level for the signal-to-interference ratio for successful transmission of the data packet over the requested link; and
sending a transmit power level message to the terminal device, the transmit power level message based on the determined transmit power level for successful transmission of the data packet over the requested link.

20. The method according to claim 17, wherein the step of measuring a received signal-level at the one base station includes the steps of:

sending a test permit message to the terminal device;

transmitting a test message from the terminal device; and measuring a received signal-level of the transmitted test message at the one base station.

21. The method according to claim 17, further comprising the steps of:

forming a matrix having a plurality of first and second type elements, the first type element corresponding to a path gain $G_{ii}$ of a link between a base station $BS_i$ and a terminal device $T_i$, and the second type element corresponding to a path gain $G_{ij}$ of a link between a base station $BS_i$ and a terminal device $T_j$ and to a path gain $G_{ji}$ of a link between a base station $BS_j$ and a terminal device $T_i$, where i≠j;

setting a value of the first type elements to equal zero;

setting a value of the second type elements to be large; and updating each respective element of the matrix based on the measured received signal-level at the one base station.

22. The method according to claim 2, wherein the step of granting permission is based on a path-gain matrix for the requested link.

23. The method according to claim 2, wherein the packet-switched wireless network is coupled to a plurality of stations, each station comprising part of a connection having an associated quality of service and the packet-switched wireless network having a virtual service rate, the method further comprising the steps of:

creating a data packet token to represent a data packet received at a station of the plurality of stations; and placing the data packet token in a global wireless network queue based on the quality of service associated with the connection and based on the virtual service rate of the packet-switched wireless network.

24. The method according to claim 23, further comprising the steps of:

using the data packet token from the global wireless network queue to create a slot assignment for the switched wireless network at the virtual service rate of the packet-switched wireless network; and controlling a time and a manner of transmission of the data packet in accordance with the slot assignment.

25. The method according to claim 24, further comprising the steps of:

determining a status of the global wireless network queue; and placing the data packet token in the global wireless network queue further based on the status of the global wireless network queue.

26. The method according to claim 25, wherein the status of the global wireless network queue includes, an empty status, a not-full status and a full status, and wherein the data packet token is placed in the queue when the global wireless network queue status is one of the empty status and the not-full status.

27. The method according to claim 26, wherein each connection has a related input queue, and wherein the step of creating the data packet token includes the step of:

creating a plurality of data packet tokens for the respective input queues of the plurality of connections, and placing the plurality of data packet tokens in the global wireless network queue based on the respective quality of services associated with the stations at which the data packets are received and based on the virtual service rate of the packet-switched wireless network when the global wireless network queue has the not-full status and when the quality of service for each connection is not achieved.

28. A method of providing access for a plurality of stations to a packet-switched wireless network, each station forming a component of a connection having an associated quality of service and the packet-switched wireless network having a virtual service rate, the method comprising the steps of:

creating a data packet token to represent a data packet received at a station of the plurality of stations; and placing the data packet token in a global wireless network queue based on the quality of service associated with the connection and based on the virtual service rate of the packet-switched wireless network.

29. The method according to claim 28, further comprising the steps of:

using the data packet token from the global wireless network queue to create a slot assignment for the switched wireless network at the virtual service rate of the packet-switched wireless network; and controlling a time and a manner of transmission of the data packet in accordance with the slot assignment.

30. The method according to claim 29, further comprising the steps of:

determining a status of the global wireless network queue; and placing the data packet token in the global wireless network queue further based on the determined status of the global wireless network queue.

31. The method according to claim 30, wherein the status of the global wireless network queue includes, an empty status, a not-full status and a full status; and wherein the data packet token is placed in the queue when the global wireless network queue status is one of the empty status and the not-full status.

32. The method according to claim 31, wherein each station includes an input queue; and wherein the step of creating the data packet token includes the step of creating a plurality of data packet tokens for the respective input queues of the plurality of stations; and placing the plurality of data packet tokens in the global wireless network queue based on the respective quality of service associated with the stations at which the data packets are received and based on the virtual service rate of the packet-switched wireless network when the global wireless network queue has the not-full status and when the quality of service for each connection is not achieved.

* * * * *